(12) United States Patent
Yokota

(10) Patent No.: US 7,010,297 B2
(45) Date of Patent: Mar. 7, 2006

(54) MOBILE MANAGEMENT METHOD FOR MOBILE COMMUNICATIONS, AND SWITCH AND HOME LOCATION REGISTER USED IN MOBILE COMMUNICATIONS SYSTEM

(75) Inventor: Fumihiko Yokota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 405 days.

(21) Appl. No.: 10/310,266

(22) Filed: Dec. 2, 2002

(65) Prior Publication Data

US 2003/0119502 A1   Jun. 26, 2003

Related U.S. Application Data

(63) Continuation of application No. PCT/JP00/03599, filed on Jun. 2, 2000.

(51) Int. Cl.
*H04Q 7/20* (2006.01)

(52) U.S. Cl. ................ 455/433; 455/435.1; 455/432.1; 455/456.5; 455/456.6

(58) Field of Classification Search ................ 455/433, 455/440, 432, 435, 458, 426, 566, 456, 435.1, 455/432.1, 456.5, 456.6

See application file for complete search history.

(56) References Cited

U.S. PATENT DOCUMENTS

| 5,509,118 A | 4/1996 | Tuulos et al. |
| 5,901,353 A | 5/1999 | Pentikainen |
| 5,915,220 A * | 6/1999 | Chelliah .................. 455/435.2 |
| 6,584,312 B1 * | 6/2003 | Morin et al. ................. 455/433 |

FOREIGN PATENT DOCUMENTS

| JP | 11-331908 | 11/1999 |
| WO | WO 94/09600 | 4/1994 |
| WO | 99/56492 | 11/1999 |

* cited by examiner

*Primary Examiner*—Erika A. Gary
*Assistant Examiner*—Wayne Cai
(74) *Attorney, Agent, or Firm*—Katten Muchin Rosenman LLP

(57) ABSTRACT

When location registration is requested from a mobile terminal to a second subscriber profile management means of a switch, the second subscriber profile management means carries out a location registration procedure with respect to a first subscriber profile management means of a home location register. A subscriber profile of the mobile terminal is not transmitted from the first subscriber profile management means to the second subscriber profile management means. Accordingly, the amount of transmission of subscriber profiles from the home location register to the switch is reduced, which prevents the traffic from increasing.

20 Claims, 16 Drawing Sheets

Cellular Activation Service

Network Activation Service

FIG.18

| TRANSMISSION AVAILABILITY TABLE ||
|---|---|
| Switch ID | Availability of Transmission |
| XXXXX 1 | Unavailable |
| XXXXX 2 | Unavailable |
| XXXXX 3 | Unavailable |
| ⋮ | ⋮ |

MOBILE MANAGEMENT METHOD FOR MOBILE COMMUNICATIONS, AND SWITCH AND HOME LOCATION REGISTER USED IN MOBILE COMMUNICATIONS SYSTEM

This application is a continuation of international application number PCT JP00/3599, filed Jun. 2, 2000.

FIELD OF INVENTION

The present invention relates to a mobile management method for mobile communications, and a switch and a home location register used in a mobile communications system. The invention particularly relates to a mobile management technique implemented in a mobile communications system in which a home location register manages location information of a mobile terminal and a subscriber profile of that mobile terminal, and in which a switch manages location information and the subscriber profile of a mobile terminal located in a location registration area controlled by this switch.

BACKGROUND ART

In a mobile communications system, the location of a mobile terminal is always monitored in order to determine in which location registration area the mobile terminal is located geographically. This is done mainly for the purpose of activating the service for that mobile terminal. Every time the mobile terminal moves from one area to another, the mobile terminal transmits a notice to the network, and the network stores the location information transmitted from the mobile terminal in an appropriate database.

The location information is stored and managed in an HLR (Home Location Register). Services for a mobile terminal, including transmission of a call to the mobile terminal, are activated based on the location information stored in the HLR. On the other hand, there are two types of methods for managing a subscriber profile, which is information about a subscriber, such as contract terms and registered services.

The first method is referred to as an HLR method. In the HLR method, the subscriber profile is stored only in the HLR. Such subscriber profile is read out of the HLR storage every time it is required. The second method is referred to as a VLR (Visitor Location Register) method. In the VLR method, the subscriber profile is transmitted to a database furnished in the corresponding area in which location registration has been made. Currently, the VLR method is the mainstream in mobile communications systems.

FIG. 1 illustrates a conventional mobile communications system. Multiple radio base stations 10a, 10b, . . . , are connected to the associated radio control station 12b. Similarly, radio base stations 10i, 10j, . . . , are connected to the associated radio control station 12k. Each radio base station defines its service area. The radio control stations 12a, 12b, . . . , 12j, 12k . . . are connected to associated switching stations (or switches) 14a, 14b, etc. The switching stations 14a, 14b, . . . are connected to a home location registration station (or a home location registration apparatus) 16.

The home location registration station 16 is provided with an HLR 17. Each of the switching stations 14a, 14b, . . . , is provided with a VLR 15. HLR 17 is logic and database furnished in the home location registration station, and used to manage the location of a mobile terminal. VLR 15 is logic and database furnished in the switching station, and used to manage the location of a mobile terminal. In this specification, both HLR 17 and VLR 15 represent logical functions, and they are not always consistent with the node names (HLR, VLR) used in a particular system, such as GMS.

There is a tendency extending back over recent years toward reducing the area size of a base station (i.e., location-registration area) for the purpose of dealing with an increase of subscribers along with the progress of mobile communications services. By making the location-registration area as small as possible, the load on the database of the switching station or the VLR 15 managing that area can be reduced when the network calls a mobile terminal located in that area.

However, reducing the location-registration area size inevitably leads to an increase of the number of times conducting location registration, which is a procedure taken when the mobile terminal moves to a new area to inform the network of the new location. Since HLR 17 manages a huge number of mobile terminals, the HLR 17 suffers from a heavy load when the traffic for location registration increases.

With the VLR method, upon updating the location information of a mobile terminal, HLR 17 downloads the subscriber profile and transmits it to the VLR 15 that controls the base-station area into which the mobile terminal has moved. This download and transmission procedures greatly affect the network. For example, if a subscriber moves by train across several areas under different base stations, location registration is carried out and the subscriber profile is downloaded onto the associated VLR 15 every time the train moves into a new area. The subscriber profile is used to activate a service, such as relaying a call from a caller to that subscriber or transmitting a call from the subscriber to a third person. If no service is activated in the areas under the control of the VLR 15 that has received the subscriber profile, that subscriber profile will not be used FIG. 2 illustrates the conventional location registration. In this example, a mobile terminal 20 moves across location-registration areas #a, #b, #c and #d, and a service is activated in area #d. The mobile terminal 20 transmits a location registration request every time it moves into the new area. The associated VLRs 15a, 15b, 15c, and 15d carry out a location registration process with respect to the HLR 17 to update the location of the mobile terminal 20 (as indicated by the dashed bi-directional arrows), and a download process of the subscriber profile (indicated by the bold bi-directional arrows).

The mobile terminal 20 does not activate a service in location-registration areas #a, #b, and #c, and if no network activation occurs in these areas, the subscriber profile transmitted to VLRs 15a, 15b and 15c becomes futile, and unnecessary traffic is produced.

With the conventional technique, subscriber profiles that may not be used in many cases are downloaded frequently, which not only causes the network traffic to increase, but also increases the load of database processing at HLR 17 and VLRs 15a, 15b, 15c and 15d.

SUMMARY OF THE INVENTION

It is an object of the present invention to provide a mobile management method used in the mobile communications system and for reducing transmission of subscriber profiles (all or a portion of the subscriber profiles stored in a home location registration station) from a home location register to a switch to prevent the traffic from increasing. It is also an object of the present invention to provide a switch and a home location register, which are capable of reducing unnecessary transmission of subscriber profiles from the home location register to the switch.

To achieve the objects, a mobile management method is employed in a mobile communications system that includes a home location register having a first subscriber profile management means for managing location information of a mobile terminal and a subscriber profile of that mobile terminal, and a switch having a second subscriber profile management means that manages location information and the subscriber profile of a mobile terminal located in an area under the control of this switch. In the mobile management method, when a location registration request is transmitted from the mobile terminal to the second subscriber profile management means, the second subscriber profile management means provides the location registration request to the first subscriber profile management means. The first subscriber profile management means does not transmit the subscriber profile of this mobile terminal to the second subscriber profile management means.

Upon receiving the location registration request, the home location register updates the location of the mobile terminal; however, it does not transmit the subscriber profile to the switch. Consequently, unnecessary transmission of subscriber profiles from the home location register to the switch can be reduced, which prevents the traffic from increasing.

BRIEF DESCRIPTION OF DRAWINGS

Other objects, features, and advantages of the invention will become clearer when reading the detailed description that follows, in conjunction with the accompanying drawings, in which:

FIG. 18 illustrates an example of the transmission control table according to an embodiment of the invention.

THE BEST MODE FOR CARRYING OUT THE INVENTION

Embodiments of the present invention will be described below with reference to the accompanying drawings.

Figure 3:
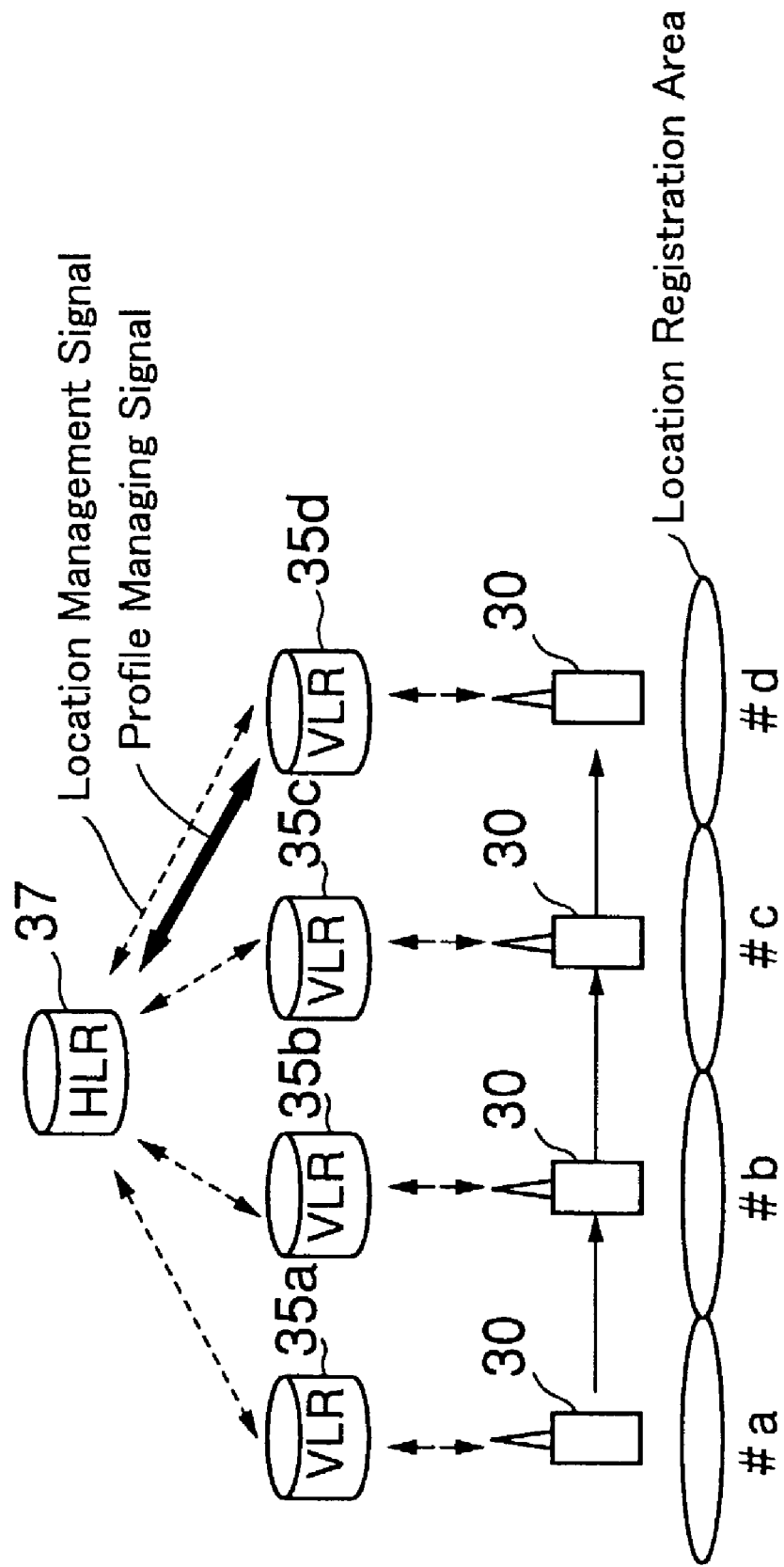
FIG. 3 illustrates a technique of location registration according to the invention.

FIG. 3 is a figure used to explain the concept of location registration according to the present invention. A mobile terminal 30 moves across location-registration areas #a, #b, #c, and #d, and it activates a service in area #d. The mobile terminal 30 conducts the location registration procedure every time the location-registration area changes. In response to this procedure, each of the VLRs 35a, 35b, and 35c carries out location registration to cause the HLR 37 to update the location information of the mobile terminal 30, as indicated by the dashed arrows. In this situation, the subscriber profile of this mobile terminal 30 is not downloaded from the HLR 37 to these VLRs 35a, 35b, and 35c because no service activation occurs.

In location-registration area #d, location registration is carried out between VLR 35d and HLR 37 to update the location information in HLR 37, as indicated by the dashed bi-directional arrow. Then, if the mobile terminal 30 activates a service, or if the network activates a service to the mobile terminal 30 located in area #d, the subscriber profile is transmitted from HLR 37 to VLR 35d, as indicated by the bold arrow.

Figure 1:
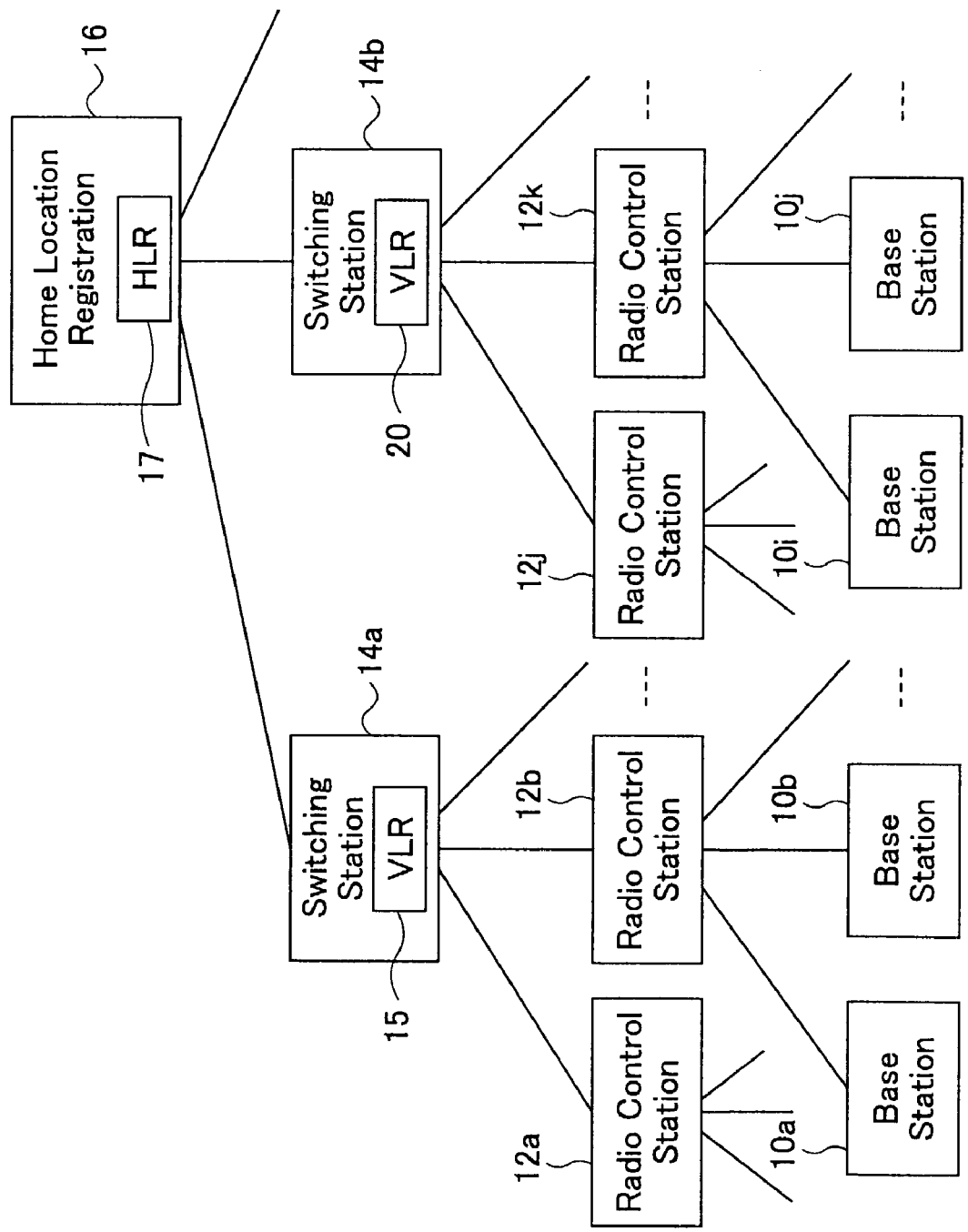
FIG. 1 illustrates the structure of a general mobile communications system.
Figure 2:
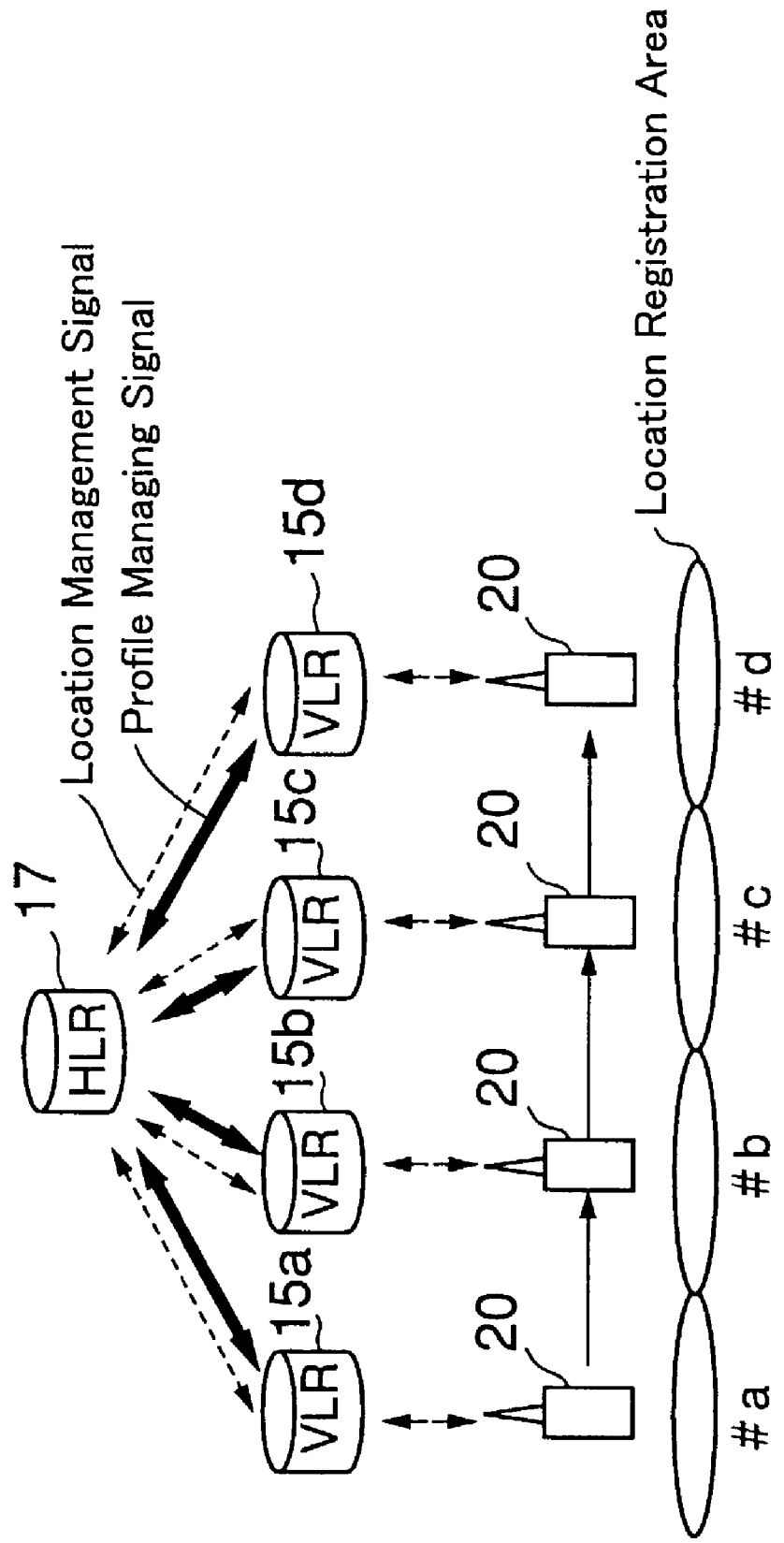
FIG. 2 illustrates a conventional technique of location registration.
Figure 4:
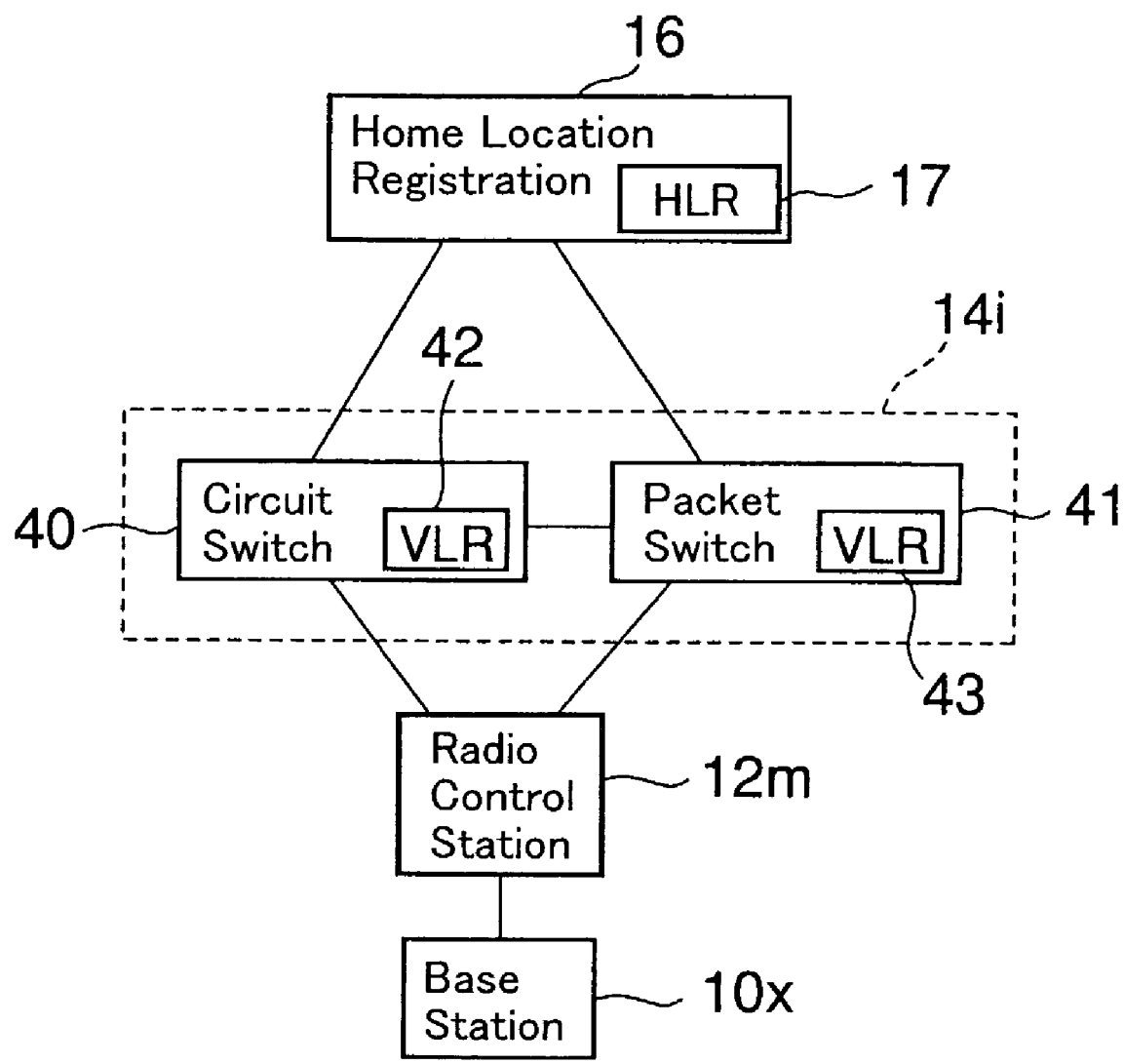
FIG. 4 illustrates a switching station having a circuit switch and a packet switch.

The mobile communication system, to which the present invention is applied, may have the architecture shown in FIG. 1, and the switching station may have either a circuit switch or a packet switch. Alternately, both the circuit switch and the packet switch may be furnished in the switching station, as illustrated in FIG. 4. In FIG. 4, switching station 14i has a circuit switch 40 and a packet switch 41, which are independently connected to the home location registration station 16 positioned at the higher hierarchy. The circuit switch 40 and the packet switch 41 are also independently connected to each of the radio control stations (e.g., the radio control station 12m) positioned at the lower hierarchy. The circuit switch 40 and the packet switch 41 have the associated VLRs 42 and 43, respectively.

The circuit switch 40 and the packet switch 41 are mutually connected, and a location registration request is transmitted from the mobile terminal to one of the VLRs 42 and 43, via the radio base station 10X and the radio control station 12m. Similarly, location registration procedure is conducted between the HLR 17 and one of the VLRs 42 and 43, and the subscriber profile is transmitted from the HLR 17 to one of the VLRs 42 and 43 upon service activation.

Figure 5:
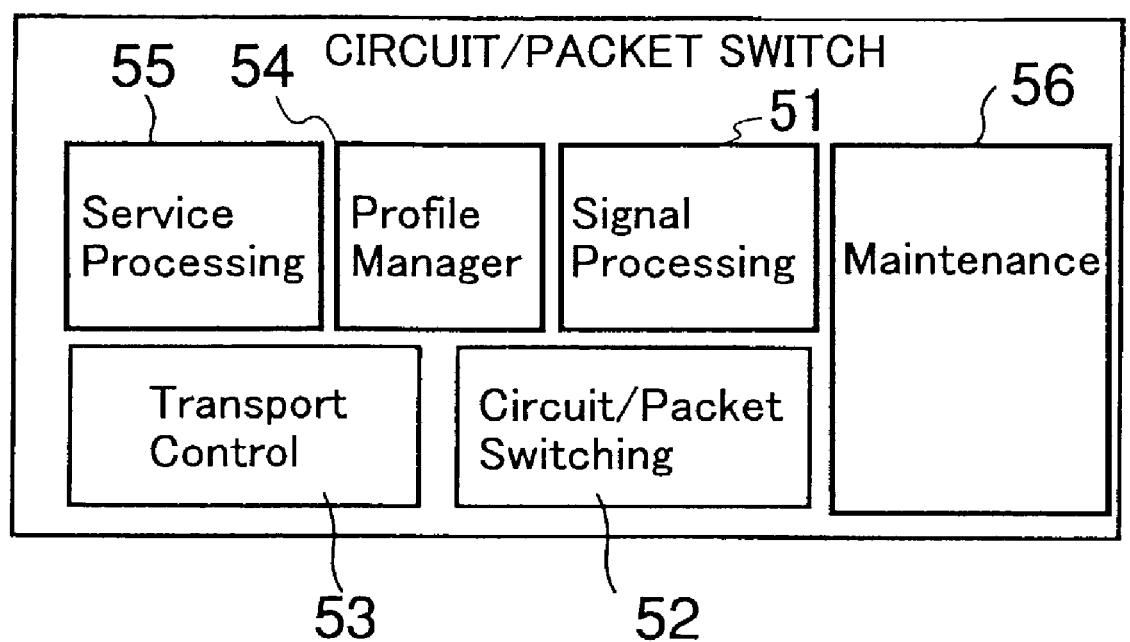
FIG. 5 illustrates an example of the circuit switch or the packet switch used in the mobile management method according to an embodiment of the invention.

FIG. 5 is a block diagram of the circuit switch or the packet switch used in the mobile management method of the present invention. A signal processing unit 51 carries out multiplexing, separation, signaling, etc. A circuit/packet switching unit 52 carries out circuit switching or packet switching. A transport control unit 53 regulates signal transmission through transmission lines between switching stations.

A profile manager 54 is the VLR itself, which comprises the logic and the database required for managing the mobility of the mobile terminal. The profile manager 54 manages the subscriber information of a mobile terminal that is located in the area of a base station connected to this switching station when the location of such a mobile terminal has been registered. A service processing unit 55 causes the VLR to activate a service for the mobile terminal, such as relaying a call to and from the mobile terminal, or recording messages when the call is not received. A maintenance unit 56 monitors the operation states of the switch as a whole to maintain good operation conditions.

Figure 6:
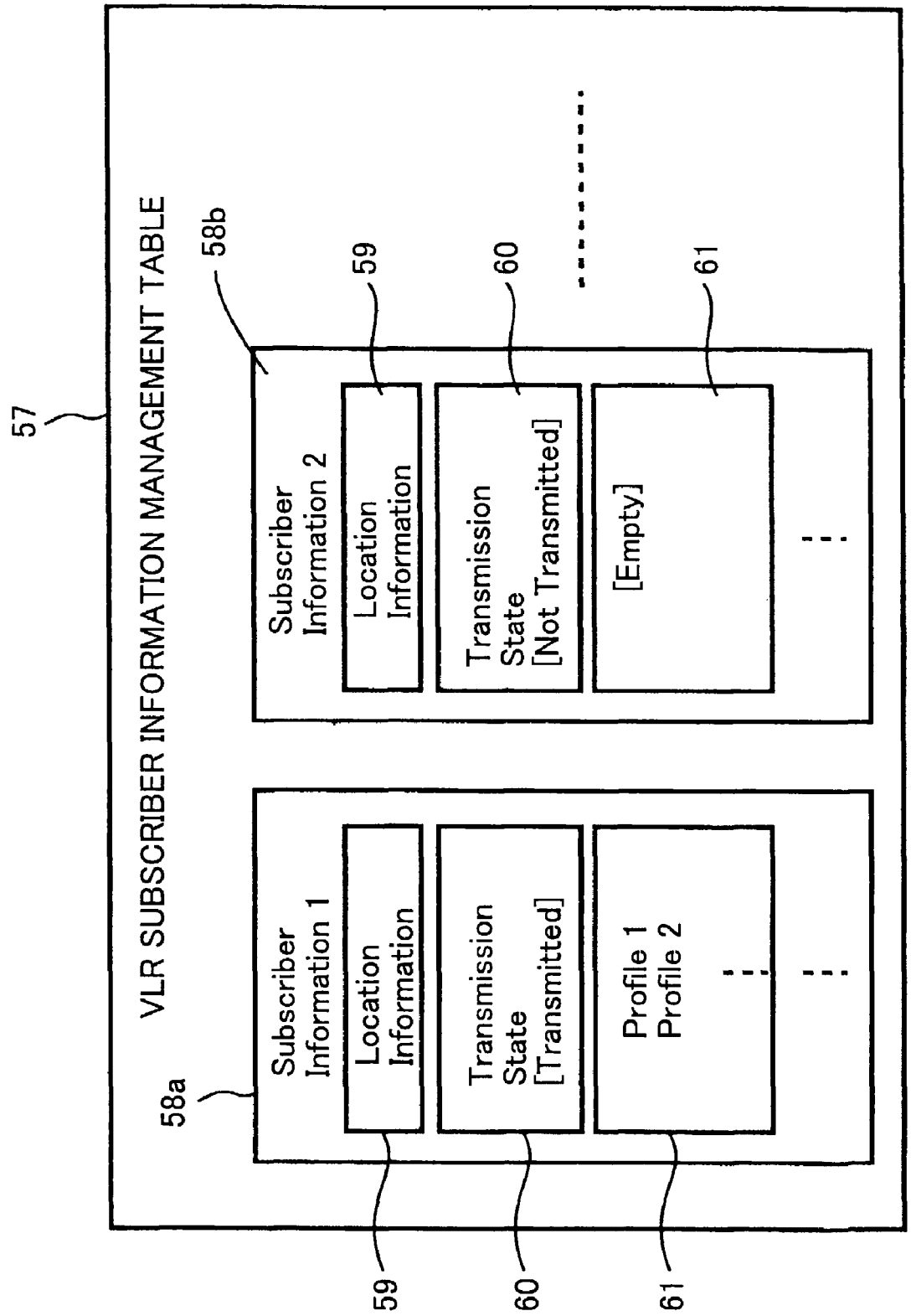
FIG. 6 illustrates an example of the VLR subscriber information management table.

The profile manager 54 has a VLR subscriber information management table 57, which is illustrated in FIG. 6. The VLR subscriber information management table 57 stores subscriber information 58a, 58b, . . . , in one-to-one correspondence with the identifiers of mobile terminals. Subscriber information includes location information 59, a transmission state 60 that represents whether or not the subscriber profile has been transmitted from the HLR, and a subscriber profile 61 if it has been received from the HLR. As to the subscriber information 58a, the transmission state 60 represents "Transmitted", and the profiles 1 and 2 are stored as the subscriber profile 61. On the other hand, in the subscriber information 58b, the transmission state 60 represents "Not Transmitted", and therefore, the subscriber profile 61 is empty.

Figure 7:
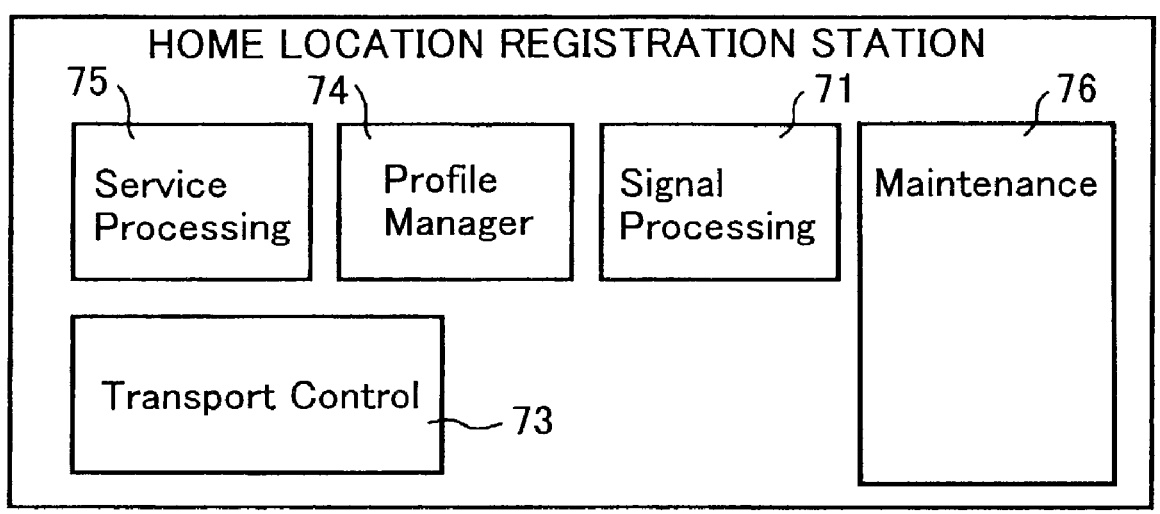
FIG. 7 illustrates a home location registration station used in the mobile management method according to an embodiment of the invention.

FIG. 7 is a block diagram of the home position registration station according to an embodiment of the invention. A signal processing unit 71 carries out multiplexing and separation of signals, as well as signaling operations. A transport control unit 73 regulates signal transmission through transmission lines between switching stations. A profile manager 74 is the HLR itself, which comprises the logic and the database required for managing the mobility of the mobile terminal. The profile manager 74 manages the subscriber information of all the subscribers. A service processing unit 75 causes the HLR to activate a service for the mobile terminal, such as relaying a call to and from the mobile terminal, or recording messages when the call is not received. A maintenance unit 76 monitors the operation states of the switch and maintains good operation conditions.

Figure 8:
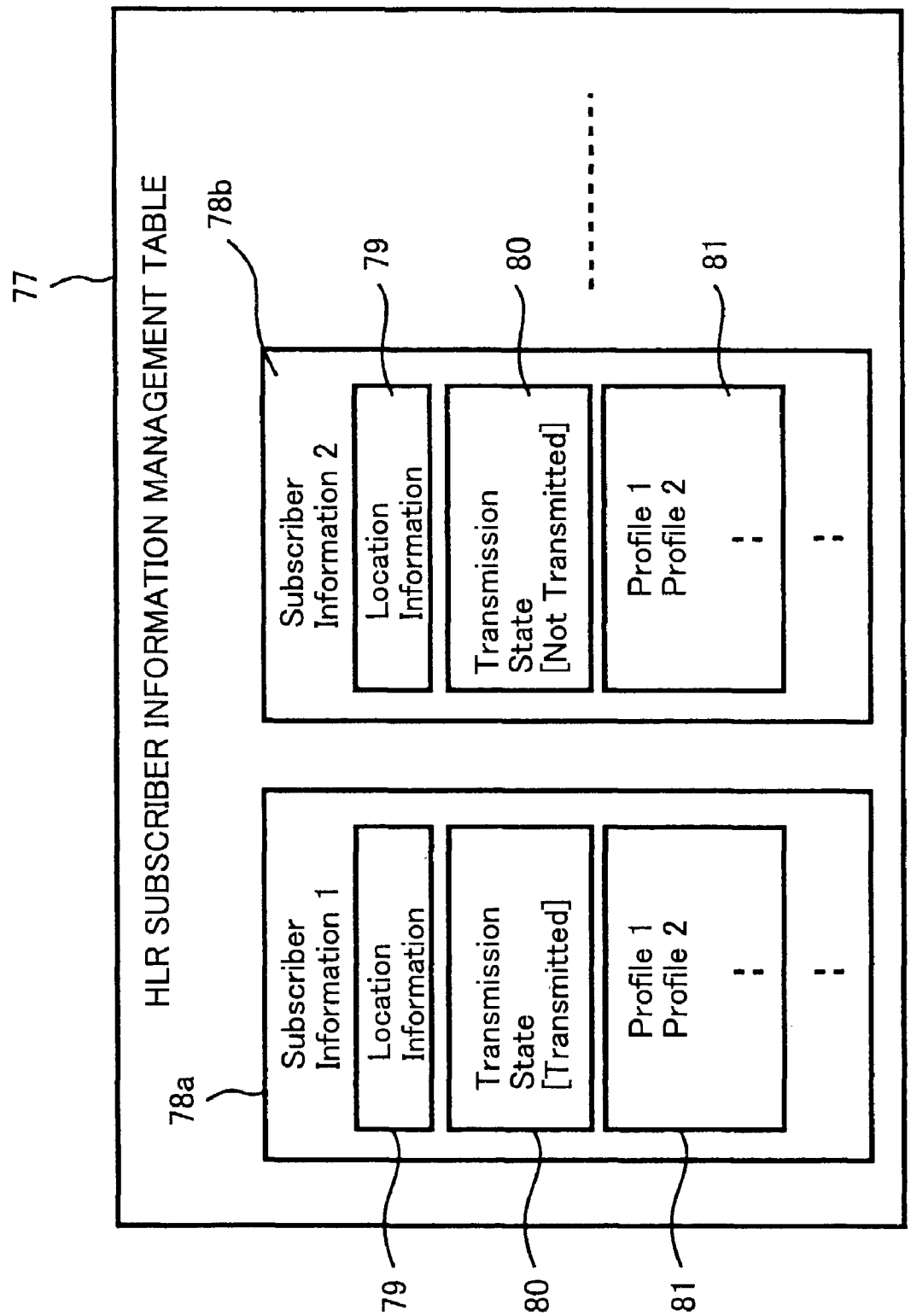
FIG. 8 illustrates an example of the HLR subscriber information management table.
Figure 9:
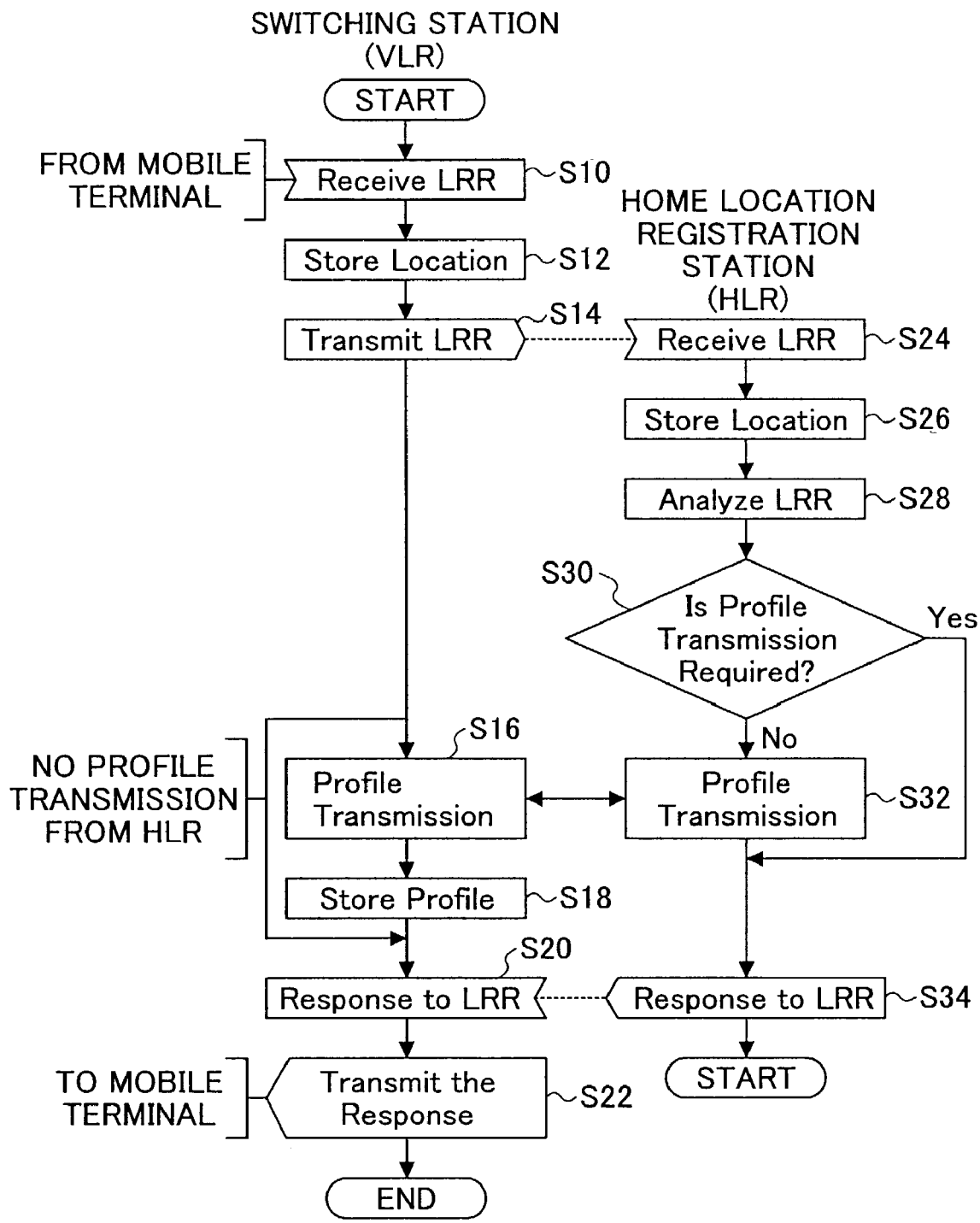
FIG. 9 is a flowchart showing a location registration process carried out by the switching station and the home location registration station according to an embodiment of the invention.

The profile manager 74 has an HLR subscriber information management table 77, which is illustrated in FIG. 8. The HLR subscriber information management table 77 stores subscriber information 78a, 78b, . . . , in one-to-one correspondence with the mobile terminals. Subscriber information includes location information 79 representing, for example, the current base station area, a transmission state 80 that represents whether or not the subscriber profile has been transmitted to a VLR, and a subscriber profile 81. As to the subscriber information 78a, the transmission state 80 represents "Transmitted", and profiles 1 and 2 are stored. In the subscriber information 78b, the transmission state 80 represents "Not Transmitted", and profiles 1 and 2 are stored FIG. 9 is a flowchart of a location registration procedure executed by the switching station and the home location registration station according to an embodiment of the invention. When a location registration request (LRR) is transmitted from a mobile terminal, the switching station receives the location registration request in step S10. In step S12, the switching station enters the subscriber information, together with the identifier of this mobile terminal, in the VLR subscriber information management table 57, and stores the location information in this subscriber information. Then, in step S14, the switching station transmits a location registration request signal to the home location registration station.

Figure 10:
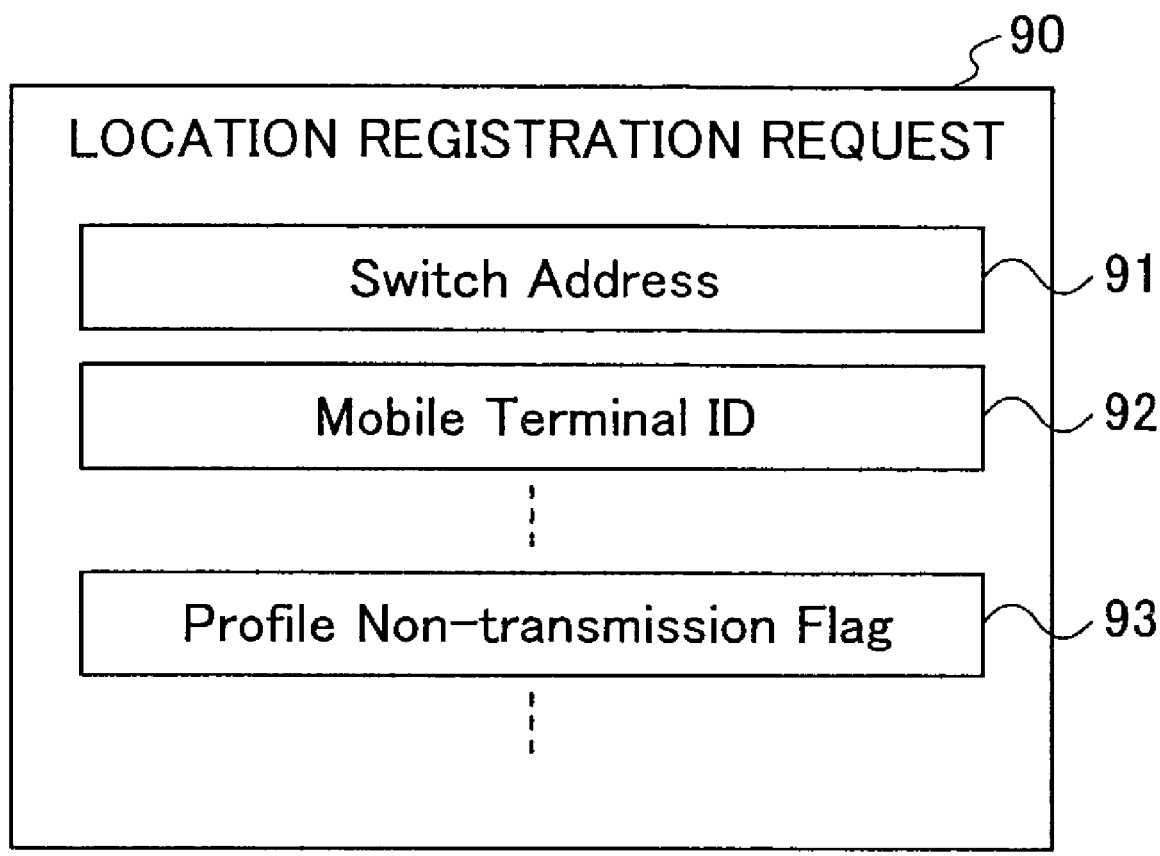
FIG. 10 illustrates an example of the location registration request.

FIG. 10 illustrates an example of the location registration request signal. Location registration request signal 90 includes an address 91 of the switch, a mobile terminal ID 92, and a profile non-transmission flag 93. This profile non-transmission flag 93 is an example of means for controlling the HLR so as not to transmit the subscriber profile to the switch when location registration is implemented in the HLR. If an arrangement of not transmitting the subscriber profile upon location registration has been set up among all the switching stations 14a and 14b shown in FIG. 1 and the home location registration station 16 in advance, then the profile non-transmission flag 93 is unnecessary.

Returning to FIG. 9, the home location registration station receives the location registration request signal in step S24. Then, in step S26, the home location registration station stores the address 91 of the switch, from which the location registration request signal has been transmitted, in the HLR subscriber information management table 77. To be more precise, the address 91 is stored in the location information 79 of the subscriber information corresponding to the mobile terminal ID 92 contained in the location registration request signal. In step S28, the profile non-transmission flag 93 contained in the location registration request signal is analyzed, and it is determined in step S30 whether or not transmission of the associated subscriber profile is required, based on the analysis result.

If profile transmission is required, the subscriber profile 81 stored in the subscriber information in the HLR subscriber information management table 77 is transmitted to the switch in step S32, and then, the process proceeds to step S34. If the profile transmission is unnecessary, the process jumps to step S34, in which response to the location registration is made. Then, the process terminates in the home location registration station.

Figure 14:
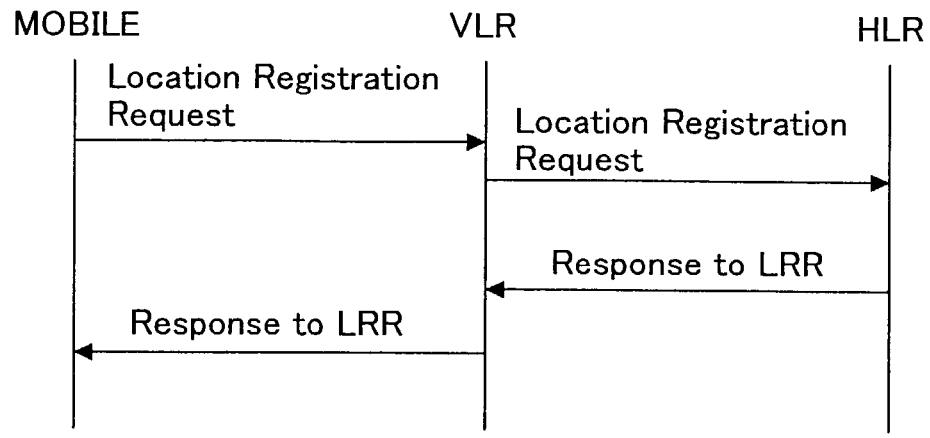
FIG. 14 illustrates a sequence of location registration carried out in the mobile management method according to the invention.

If the subscriber profile has been transmitted from the home location registration. station, the switching station carries out a transmission procedure of the subscriber profile in step S16. Then, in step S18, the switching station stores the received subscriber profile in the VLR subscriber information management table 57. To be more precise, the received subscriber profile is stored in the field of subscriber profile 61 of the subscriber information corresponding to mobile terminal ID 92 contained in the location registration request. Step S16 includes transmission of a confirmation of receipt of the subscriber profile to the home location registration station. When the home location registration station confirms the receipt of the subscriber profile at the switching station, it transmits a response to the location registration to the switching station in step S34.

there is no transmission of the subscriber profile 81, steps S16 and S18 are skipped. Then, in step S20, the switching station receives the response to the location registration from the home location registration station. In step S22, the switching station transmits a response to the mobile terminal that has requested the location registration. Then, the process in the switching station terminates. The above-described sequence of location registration is illustrated in FIG. 14.

Figure 11:
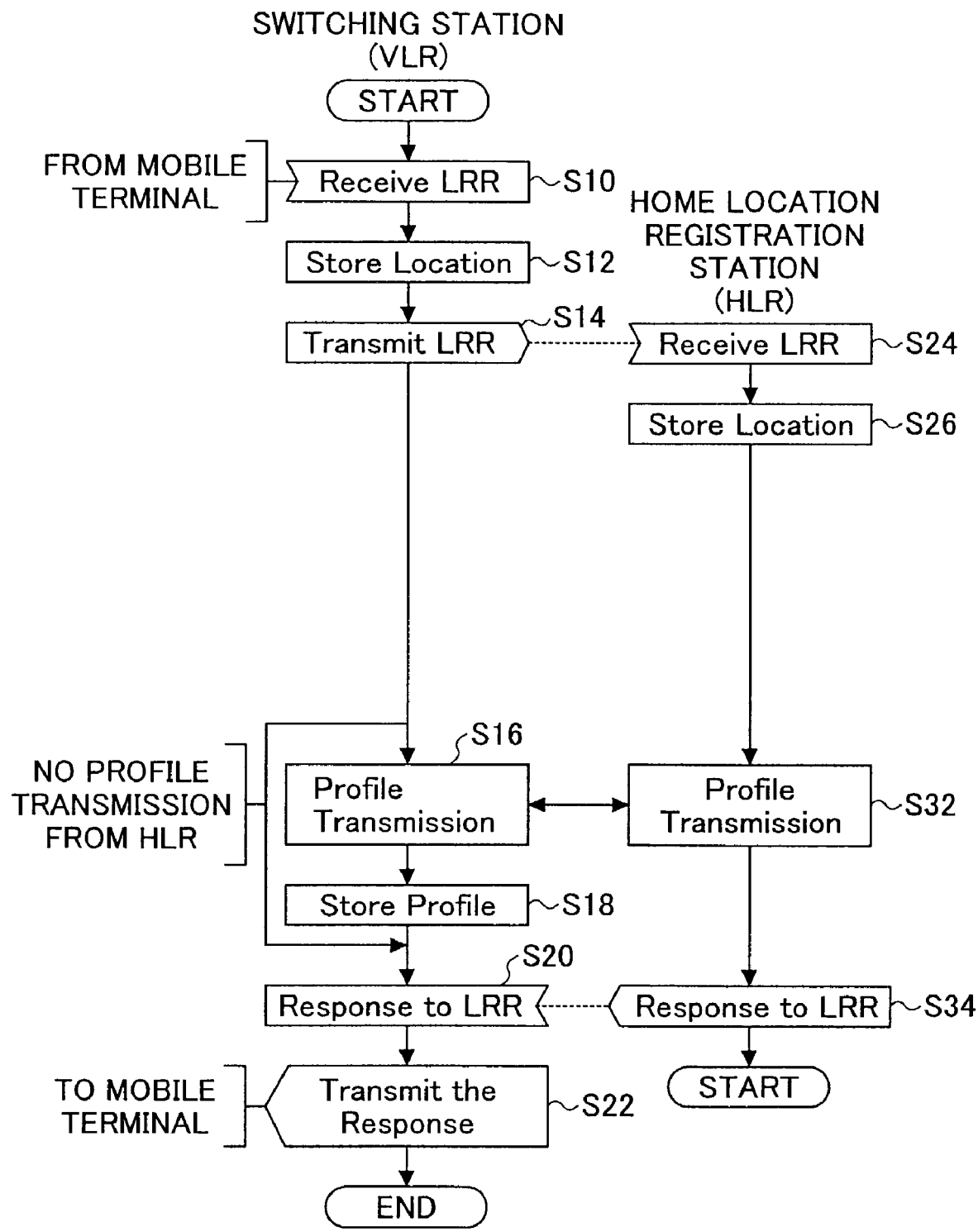
FIG. 11 is a flowchart showing a conventional location registration process carried out by the conventional switching station and the home location registration station.
Figure 15:
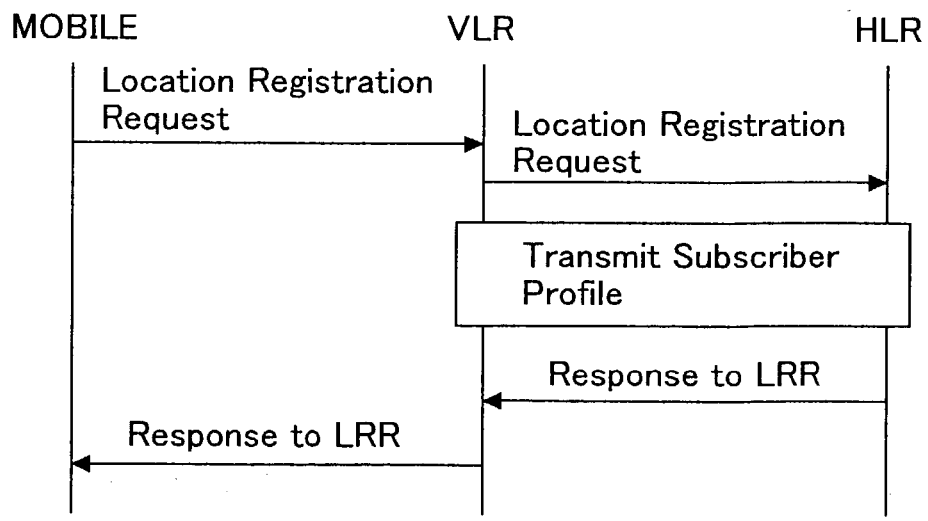
FIG. 15 illustrates a sequence of location registration carried out in the conventional method.

For the purpose of comparison, a conventional operation flow of the location registration carried out by a conventional switching station and a conventional home location registration station is illustrated in FIG. 11. The same steps as those shown in FIG. 9 are denoted by the same numerical references, and the explanation for them will be omitted. The conventional flow shown in FIG. 11 does not include steps S15, S28, and S30 of FIG. 9. Accordingly, in the conventional flow, every time a location registration request is transmitted from the mobile terminal, the corresponding subscriber profile is transmitted from the home location registration station to the switching station. The sequence of the conventional location registration is illustrated in FIG. 15.

In comparison, according to the above-described embodiment, the home location registration station carries out location registration upon a location registration request from a mobile terminal; however, it does not transmit the subscriber profile to the switching station. Consequently, unnecessary transmission of subscriber profiles from the home location registration station to the switching stations can be reduced, which can prevent the traffic from unnecessarily increasing.

Figure 12:
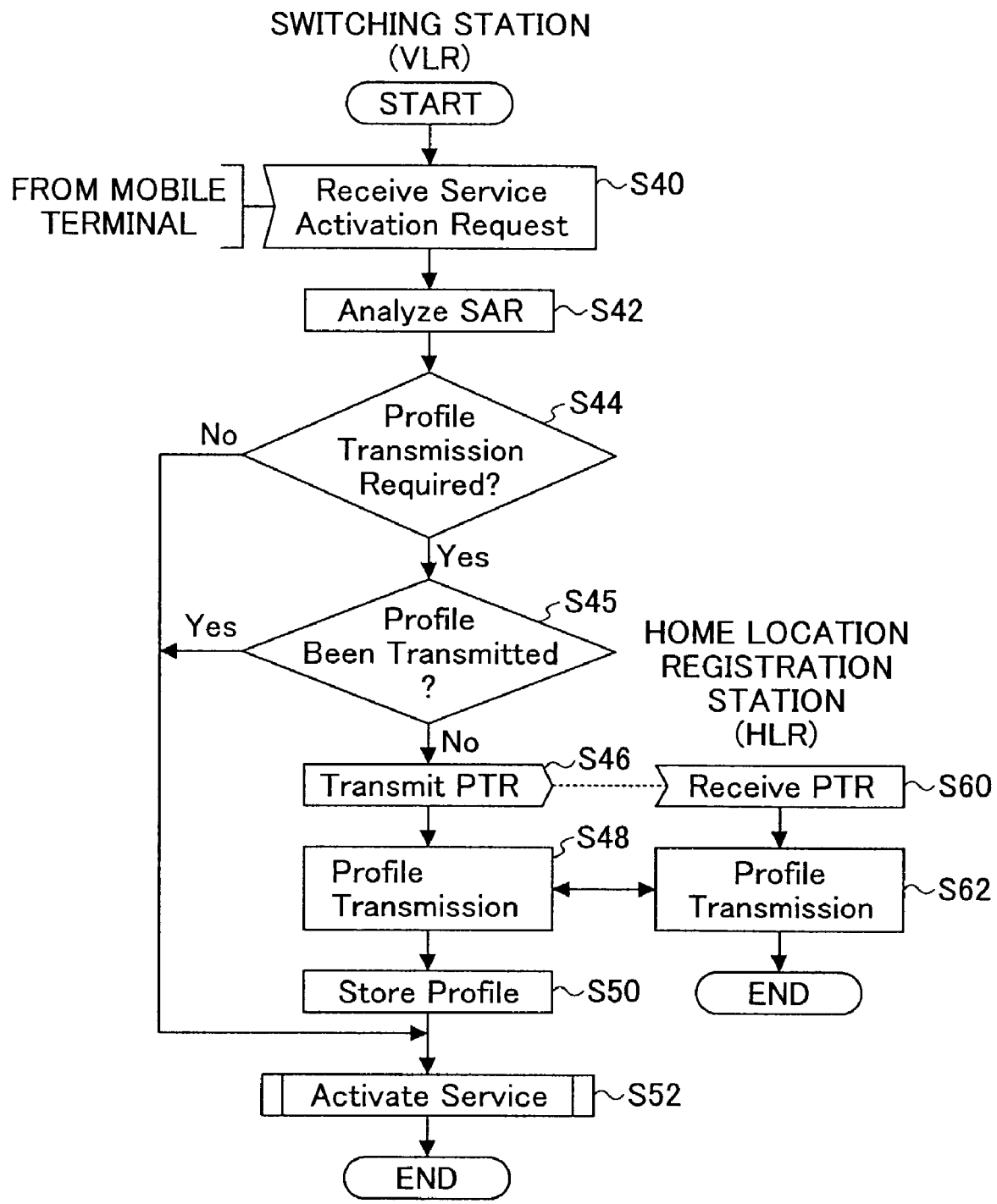
FIG. 12 is a flowchart showing a service activation process carried out by the switching station and the home location registration station in response to a request from a mobile terminal according to an embodiment of the invention.

FIG. 12 is a flowchart showing a service activation, process carried out by the switching station and the home location registration station in response to a request from the mobile terminal according to an embodiment of the invention. When there is a service activation request from a mobile terminal, the switching station receives the service activation request in step S40, and it analyzes the service activation request (SAR) in step S42 to determine the service that is to be activated.

Then, in step S44, the switching station determines whether or not the service to be activated needs a subscriber profile. For example, a call to the police or the fire station does not require a subscriber profile to activate the service. In this case, the process jumps to step S52 to activate the service. If the service to be activated, such as an ordinary personal call, requires the subscriber profile, the process proceeds to step S45.

In step S45, the switching station determines whether the transmission state 50 in the subscriber information stored in the VLR subscriber information management table 57, in association with the mobile terminal that generates the service activation request, represents "Transmitted". If the subscriber profile has been transmitted to the switching station, the process jumps to step S52 to activate the requested service. If the subscriber profile has not been transmitted, the process proceeds to step S46, in which the switching station transmits a profile transmission request (PTR) to the home location registration station.

The home location registration station receives the profile transmission request in step S60. In step S62, the home location registration station retrieves the requested subscriber profile 81 of the subscriber information stored in the HLR subscriber information management table 77, and transmits the subscriber profile 81 to the switching station. Then, the process in the home location registration terminates.

Figure 16:
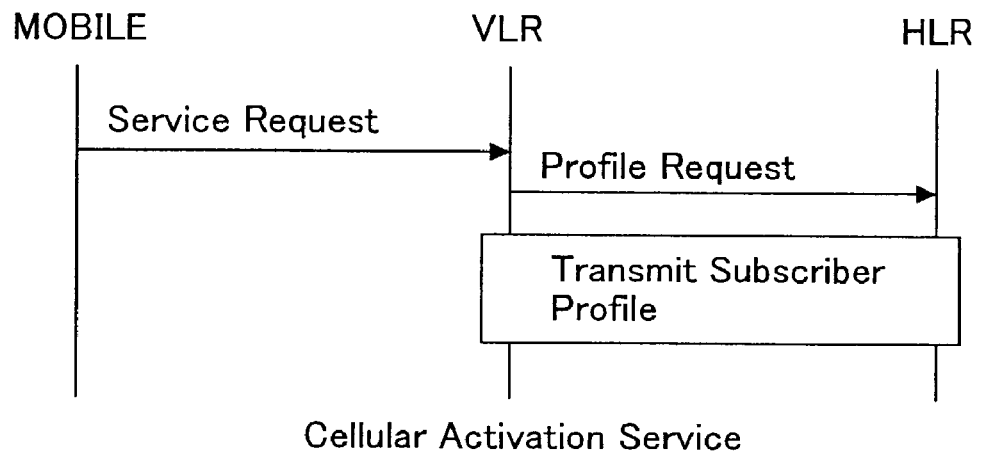
FIG. 16 illustrates a sequence of service activation carried out in response to a request from a mobile terminal in the mobile management method according to the invention.

The switching station receives the subscriber profile from the home location registration station in step S48. Then, it stores the subscriber profile in the VLR subscriber information management table 57 as the subscriber profile 61 of the subscriber information corresponding to the mobile terminal ID 92 that requested the activation of service. In step S52, the service requested by the mobile terminal is activated, and the process in the switching station terminates. The sequence of this service activation is illustrated in FIG. 16.

In this manner, when service activation is requested by a mobile terminal, the associated subscriber profile is transmitted from the HLR of the home location registration station to the VLR of the switching station. The necessary and minimum amount of transmission of subscriber profile occurs from the home location registration station to the switching station. As a result, undesirable traffic increase can be prevented.

Figure 13:
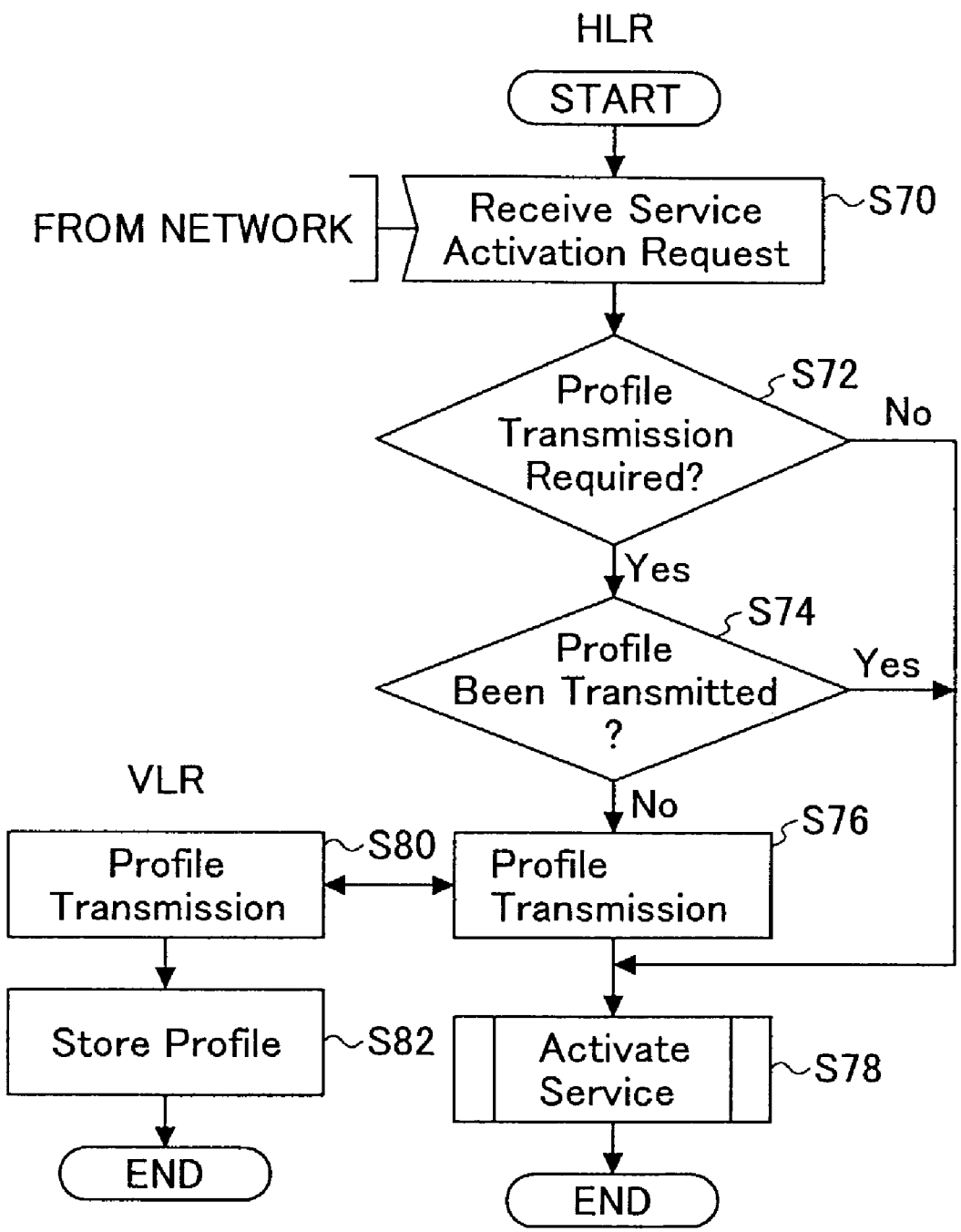
FIG. 13 is a flowchart showing a service activation process carried out by the switching station and the home location registration station in response to a request from the network.

FIG. 13 is a flowchart showing a service activation process carried out by the switching station and the home location registration station in response to a request from the network according to an embodiment of the invention. When there is a service activation request from the network, the home location registration station receives the service activation request in step S70, and it determines in step S72 whether or not the service to be activated requires the subscriber profile. If the service does not need the subscriber profile, the process jumps to step S78 to activate the service. If the service to be activated, e.g., an ordinary personal call, needs the subscriber profile, the process proceeds to step S74.

In step S74, the home location registration station determines whether the transmission state 80 in the subscriber information stored in the HLR subscriber information management table 77, in association with the mobile terminal to which the service is to be activated, represents "Transmitted". If the subscriber profile has been transmitted to the switching station, the process jumps to step S78 to activate the service. If the subscriber profile has not been transmitted, the process proceeds to step S76. In step S76, the home location registration station retrieves in the HLR subscriber information management table 77 to find the subscriber profile 81 that corresponds to the mobile station to which the service is to be activated, and transmits the subscriber profile 81 to the switching station that stores the location information 79, of this mobile terminal. Then, in step S78, the home location registration station activates the service requested from the network, and the process in the home location registration station terminated.

Figure 17:
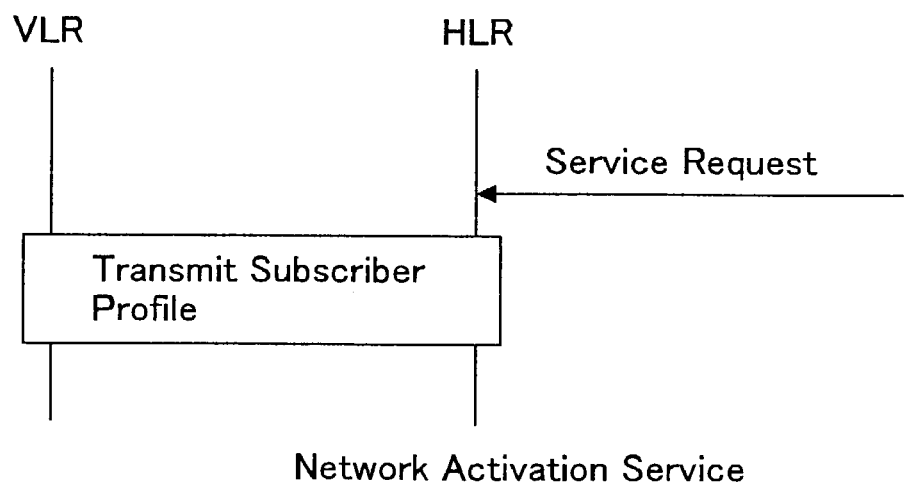
FIG. 17 illustrates a sequence of location registration carried out in response to a request from the network in the mobile management method according to the invention.

The switching station receives the subscriber profiled transmitted from the home location registration station in step S80. Then, the switching station stores the subscriber profile in the VLR subscriber information management table 57 as the subscriber profile 61 of the subscriber information corresponding to the mobile terminal ID 92 to which the service is activated. The sequence of the above-described service activation in response to the request form the network is illustrated in FIG. 17.

In this manner, when service activation is requested from the network, the necessary subscriber profile is transmitted from the HLR of the home location registration station to the VLR of the switching station. Consequently, the necessary and minimum amount of transmission of subscriber profiles occurs from the home location registration station to the switching station, and undesirable traffic increase can be prevented.

Another method for controlling the home location registration station 16 so as not to transmit subscriber profiles to the switching stations 14a and 14b shown in FIG. 1 at the time of location registration is to furnish a transmission availability table 100 shown in FIG. 18, in addition to the HLR subscriber information management table 77, in the profile manager 74. The transmission availability table 100 stores transmission availability information for all or a part of the switching stations included in the network in one-to-one correspondence with the identifier of each switching station. The availability information represents propriety of transmission of subscriber profiles to the associated switching station at the time of location registration. In the example shown in FIG. 18, switching station identifiers XXXX1, XXXX2, and XXXX3 have entries of "Unavailable".

If there is a high probability of occurrence of service activation requests from mobile terminals in a specific base station area, the switching station that controls this specific base station area may delete the profile non-transmission flag 93 from the location registration request signal when the switching station receives a location registration request from the mobile terminal that has moved into the specific base station area. In this case, the home location registration station transmits the associated subscriber profile to the switching station upon updating the location of the mobile station. With this arrangement, when service activation is requested by the mobile terminal in this specific area, the subscriber profile has already been stored in the switching station, and accordingly, the service requested by this mobile terminal can be activated promptly without time delay. The same effect can also be achieved by setting the transmission availability information of this switching station "Available" in the transmission availability table 100.

The profile manager 74 of the home location registration station corresponds to the first subscriber profile management means, and the profile manager 54 of the switching station corresponds to the second subscriber profile management means in claims. The profile non-transmission flag corresponds to instruction means, and the transmission availability table 100 corresponds to determination means in claims. Steps S40–S50, S260, and S62 correspond to the first transmission means, and steps S70–S76, S80, and S82 corresponds to the second transmission means. The VLR subscriber information management table 57 corresponds to the first administration means, and the HLR subscriber information management table 77 corresponds to the second administration means.

What is claimed is:

1. A mobile management method for a mobile communications system that comprises a home location register having a first subscriber profile management means for managing location information of a mobile terminal and a subscriber profile of this mobile terminal, and a switch having a second subscriber profile management means for managing the location information and the subscriber profile of the mobile terminal located in an area controlled by the switch, the mobile management method comprising the steps of:

carrying out location registration in the first subscriber profile management means, without transmitting the subscriber profile from the first subscriber profile management means to the second subscriber profile management means across the system, upon occurrence of a location registration request from the mobile terminal; and transmitting the subscriber profile of the mobile terminal from the first subscriber profile management means to the second subscriber profile management means upon occurrence of service activation by the mobile terminal or a network as a trigger.

2. The mobile management method according to claim 1, wherein when the second subscriber profile means receives the location registration request from the mobile termnal, the second subscriber profile management means provides an instruction to the first subscriber profile management means so as not to transmit the subscriber profile when carrying out the location registration to the first subscriber profile management means.

3. The mobile management method according to claim 1, wherein the mobile communications system includes two or more second subscriber profile management means, and each of the second subscriber profile management means causes the first subscriber profile management means not to transmit the subscriber profile independently.

4. The mobile management method according to claim 1, wherein the first subscriber profile management means determines not to transmit the subscriber profile to the second subscriber management means when the second subscriber profile management means carries out location registration to the first subscriber profile management means.

5. The mobile management method according to claim 1, wherein utilization of a service with respect to the mobile terminal triggers the first subscriber profile management means to transmit the subscriber profile of the mobile terminal to the second subscriber profile management means.

6. The mobile management method according to claim 5, wherein the service is activated by the mobile terminal, and the service activation by the mobile terminal triggers the first subscriber profile management means to transmit the subscriber profile of the mobile terminal to the second subscriber profile management means.

7. The mobile management method according to claim 6, further comprising the step of:

monitoring in the second subscriber profile management means whether or not the subscriber profile of the mobile terminal has been transmitted to the second subscriber profile management means.

8. The mobile management method according to claim 5, wherein the service is activated by a network toward the mobile terminal, and the service activation by the network triggers the first subscriber profile management means to transmit the subscriber profile of the mobile terminal to the second subscriber profile management means.

9. The mobile management method according to claim 8, further comprising the step of:

monitoring in the first subscriber profile management means whether or not the subscriber profile of the mobile terminal has been transmitted to the second subscriber profile management means.

10. The mobile management method according to claim 1, wherein the location registration is carried out in the first subscriber profile management means, without transmitting the subscriber profile from the first subscriber management means to the second subscriber management means, based on a non-transmission flag contained in the location registration request.

11. A subscriber profile transmission method for transmitting a subscriber profile of a mobile terminal from a home location register to a switch, comprising the steps of:

in response to a location registration request from the mobile terminal, transmitting an instruction from the switch to the home location register not to transmit the subscriber profile to the switch; and upon receiving a service request from the mobile terminal or a network at the switch, causing the home location register to transmit the subscriber profile of the mobile terminal to the switch.

12. The subscriber profile transmission method according to claim 11, further comprising the steps of:

determining whether or not the switch has the subscriber profile of the mobile terminal when receiving the service request; and if the switch does not have the subscriber profile of the mobile terminal, causing the home location register to transmit the subscriber profile of the mobile terminal to the switch.

13. A switch used in a mobile communications system, the mobile communications system including the switch and a home location register having a first subscriber profile management means for managing location information of a mobile terminal and a subscriber profile of the mobile terminal, the switch comprising:

a second subscriber profile management means for managing the location information and the subscriber profile of the mobile terminal located in an area controlled by the switch; and an instruction means for instructing the first subscriber profile management means not to transmit a subscriber profile of the mobile terminal to the switch when receiving a location registration request from the mobile terminal and to carry out location registration at the first subscriber profile management means, while instructing the first subscriber profile management means to transmit the subscriber profile of the mobile terminal to the switch upon receiving a service recluest from the mobile terminal or a network.

14. The switch according to claim 13, further comprising a first transmission means for causing the first subscriber profile management means to transmit the subscriber profile to the switch upon service activation by the mobile terminal.

15. A home location register used in a mobile communications system that comprises the home location register and a switch having a second subscriber profile management means for managing location information of a mobile terminal located in an area controlled by the switch and a subscriber profile of the mobile terminal, the home location register comprising:

a first subscriber profile management means for managing the location information and the subscriber profile of the mobile terminal; and a determination means for determining not to transmit the subscriber profile to the second subscriber profile management means across system until there is a trigger of service activation from the mobile terminal or a network, when location registration is carried out by the second subscriber profile management means with respect to the first subscriber profile management means.

16. The home location register according to claim 15, further comprising a second transmission means for transmitting the subscriber profile of the mobile terminal, to which a service is activated by the network, to the second subscriber profile management means upon the service activation by the network.

17. A switch used in a mobile communications system and managing a subscriber profile of a mobile terminal, comprising:

a service processing unit configured to receive a service request from the mobile terminal;

a subscriber profile management means for managing the subscriber profile that is transmitted from a home location register to the switch based on the service request; and an instruction unit configured to, in response to a location registration reciuest from the mobile terminal, to transmit an instruction to the home location register not to transmit the subscriber profile to the switch.

18. The switch according to claim 17, wherein the subscriber profile management means manages the subscriber profile transmitted from the home location register based on a determination means for determining whether or not to transmit the subscriber profile when receiving the service request.

19. The switch according to claim 17, further comprising a first administration means for monitoring whether the subscriber profile has been transmitted from the home location register.

20. The switch according to claim 19, further comprising a second administration means for monitoring whether the subscriber profile has been transmitted to the switch.

* * * * *